United States Patent [19]
Harrison

[11] 4,040,804
[45] Aug. 9, 1977

[54] HEAT AND MOISTURE EXCHANGER
[75] Inventor: Henry Harrison, Locust Valley, N.Y.
[73] Assignee: Halm Instrument Co., Inc., Glen Head, N.Y.
[21] Appl. No.: 580,317
[22] Filed: May 23, 1975
[51] Int. Cl.² ............................................. B01D 13/00
[52] U.S. Cl. ...................................... 55/158; 55/269; 165/DIG. 12; 165/165
[58] Field of Search ................. 55/388, 278, 158, 16, 55/500, 269; 210/493; 165/165, DIG. 12

[56] References Cited
U.S. PATENT DOCUMENTS

| 2,973,828 | 3/1961 | Engle | 55/278 |
| 3,258,900 | 7/1966 | Harms | 55/500 |
| 3,640,340 | 2/1972 | Leonard et al. | 165/166 |
| 3,666,007 | 5/1972 | Yoshino et al. | 165/166 |
| 3,735,559 | 5/1973 | Salemme | 55/158 |
| 3,925,021 | 12/1975 | Yoshino et al. | 55/278 |

Primary Examiner—Bernard Nozick
Attorney, Agent, or Firm—James P. Malone

[57] ABSTRACT

A heat and moisture exchanger consists of a folded sheet of water permeable paper having a plurality of folds. Separators are placed between said folds to provide air passages. Air is directed in one direction through the folds on one side of said folded paper. The return air flows in the opposite direction through said folds on the other side of said folded paper. Water and heat are transferred through the paper from one air stream to the other air stream flowing in the opposite direction.

5 Claims, 4 Drawing Figures

HEAT AND MOISTURE EXCHANGER

This invention relates to heat and moisture exchangers. More particularly, to means joining a room and the outer atmosphere for exchanging heat and moisture between incoming and outgoing air for the purpose of ventilating the room without gain or loss of heat.

In an ordinary residence about 40% of the heating load is the result of air exchange, so that an 80% effective heat exchange by means of the present invention, will reduce the total heat load by 32%. Less loss for a given amount of ventilation can be achieved if more heat and moisture exchange area is used.

The present invention provides a heat and moisture exchanger which consists of a folded sheet of water permeable paper having a plurality of folds. Separators are placed between said folds to provide air passages. Air is directed in one direction through the folds on one side of said folded paper. The return air flows in the opposite direction through said folds on the other side of said folded paper. Water and heat are transferred through the paper from one air stream to the other air stream flowing in the opposite direction.

Therefore, water and heat in entering air may be prevented from entering a room by transferring it to outgoing air through the heat and moisture exchanger. In the same way, water and heat will be prevented from leaving a room with outgoing air by transferring them to entering air.

Accordingly, the principal object of the invention is to provide conservation of heat and moisture by means of a new and improved heat and moisture exchanger.

Another object of the invention is to provide new and improved heat and moisture exchanger means between a room and outside atmosphere.

Another object of the invention is to provide new and improved heat and moisture exchanger means between a room and outside atmosphere which acts to preserve the temperature and humidity within the room while providing adequate fresh air ventilation.

Still another object of the invention is to provide heat and moisture exchange means which offers only moderate resistance to the flow of air through the exchanger.

Another object of the invention is to provide new and improved heat and moisture exchanger means comprising a folded sheet of deliquescent paper having a plurality of folds, means placed between said folds to separate said folds, means to direct air in one direction through said folds on one side of said folded paper, the return air flowing in the opposite direction through said folds on the other side of said folded paper whereby water is transferred through the paper from one air stream to the other air stream flowing in the opposite direction.

Other objects of the invention are to provide new and improved heat and moisture exchanger means which is inexpensive and simple, and is in a form which can be easily replaced or renewed if it becomes degraded by air-borne dirt, micro-organisms or fungi.

These and other objects of the invention will be apparent from the following Specification and drawings, of which:

Figure 4:
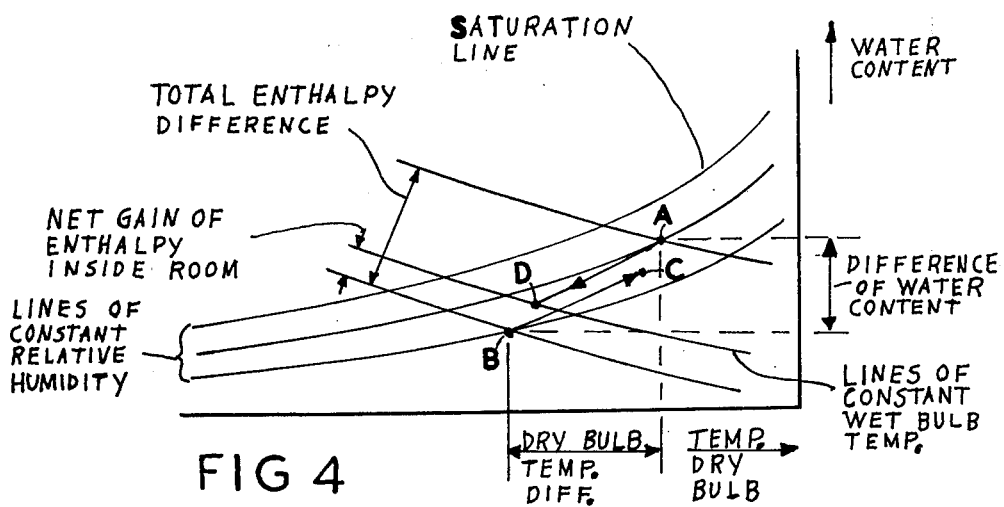
FIG. 4 is a psychrometric chart illustrating the theory of operation of the invention.

The performance of a heat and moisture exchanging device is best represented by means of a psychrometric chart, FIG. 4 which expresses the relationship between moisture content of air, wet and dry bulb temperature, relative humidity, density and total energy content or enthalpy.

A represents the state of hot moist outdoor summer air. B represents the state of cool dry indoor air (summer). C represents the state of indoor air after it has passed outward through the exchanger, and D represents the state of outdoor air after it has passed inward through the exchanger As air goes from state A to state D, it loses moisture to the permeable walls of the passages of the exchanger. It also loses heat to the walls. On the other hand, air going from B to C picks up both heat and moisture from the walls. A balance results in which the heat and water dropped by stream A to D equal the heat and water picked up by stream B to C.

The deliquescent nature of the permeable barrier greatly aids in this exchanger because it can pick up water from the stream A to D at a relative humidity much below the saturation line. The water in the paper accumulates until its vapor pressure gets high, and then it can evaporate into the stream B to C, at the same rate it comes out of a stream A to D. Thus, the air can come out at D both cooler and dryer than it goes into at A, and at a lower relative humidity.

If air in state A were exchanged with air in state B without passing through an exchanger, there would be a large net gain of total energy (enthalpy) inside the room corresponding to the total wet bulb temperature difference between states A and B. With the heat exchanger, however, most of the enthalpy in stream A to D goes over into stream B to C, and only the small enthalpy difference between B and D enters the room. Thus, the efficiency of the heat exchanger is one minus the quotient of net enthalpy gain divided by total enthalpy difference.

A model which is 80% efficient in exchanging enthalpy of hot moist outside air has been constructed. The partition area required is approximately 170 square feet for each 1000 cubic feet per hour of air exchange.

Equally good performance has been verified when the outside air is colder than the room air, as would be the situation in winter.

For continuous operation, the difference in enthalpy entering or leaving the room must be made up by a source of cold or heat but it will be evident that this difference is much smaller when a heat exchanger is used.

Counter flow heat exchangers in which heat is exchanged through a heat-conductive partition between two fluid streams flowing in opposite directions are well known and widely used. By producing heat exchange with only a small differential temperature across the partition but a large temperature differential between the ends of the flow passages, they accomplish nearly reversible heat exchange, which means that the heat exchange is almost complete, and the change of entropy of the entire system is small. Condensing and evaporating systems which may use deliquescent solutions to control the vapor pressure of water in air are also well known. The virtue of the present invention is that it combines the condensation of moisture in a deliquescent solution, from one air stream, the evaporation of the same moisture from the same solution into another air stream, and the exchange of heat between the two streams in a single simple counterflow heat and moisture exchange structure. In this new system not only is nearly all the excess heat contained in one air stream transferred to the other stream, but also nearly all the excess moisture contained in one air stream is transferred to the other at the same time.

In an ordinary residence, about 40% of the heating load is the result of air exchange, so that an 80% effective heat exchange by means of the present invention, would reduce the total heat load by 32%. Less loss for a given amount of ventilation can be achieved if more heat and moisture exchange area is used.

A sudden change in ambient conditions either inside the room or outside will bring about a transient mismatch between ingoing and outgoing streams while the heat and especially the moisture content of the membrane adjust. The time of mismatch can be minimized by using a thin membrane which requires little change in moisture or heat to adjust its vapor pressure and temperature.

Figure 1:
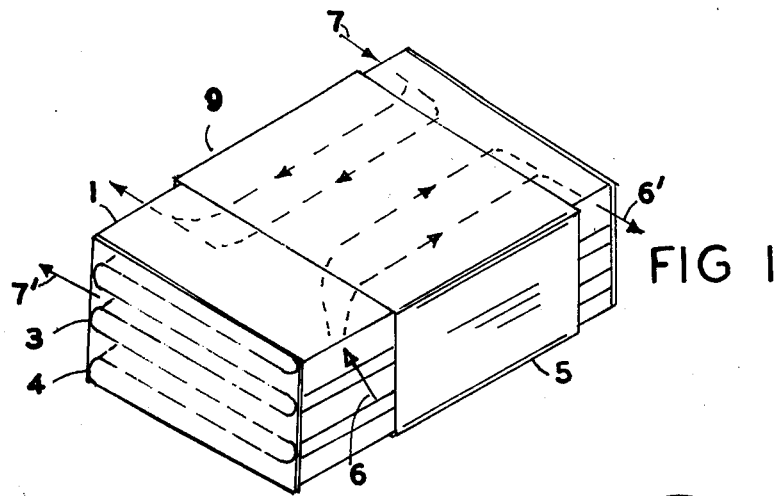
FIG. 1, is a perspective view of an embodiment of the folded sheet exchanger of the invention.

Referring to FIG. 1, the heat and moisture exchanger comprises a folded sheet 1, of water permeable or deliquescent paper which is folded in a plurality of folds 2, 3, 4, etc. Only a few number of folds are shown. A typical embodiment would be approximately 6 inches deep with the folds separated approximately 1/16 inch which contain approximately 90 spacings between the folds. The folds are held in place by means of a tape or wrapper 5, which covers the central portion of the folded sheet or cartridge 9. In a particular embodiment, the cartridge 9 might be 4 feet long by 7½ inches wide, by 6 inches deep. The ends of the cartridge are closed by dipping them in wax or a castable potting compound which adheres to the paper.

A stream of air 6, passes through one set of folds in contact with one side of the sheet and passes out the other end as illustrated by the arrow 6'. A second stream of air 7, passes in the opposite direction through the folds in contact with the opposite side of the paper passes out at the other end of the cartridge 9, as shown by the arrow 7', as also shown in FIG. 3.

Figure 2:
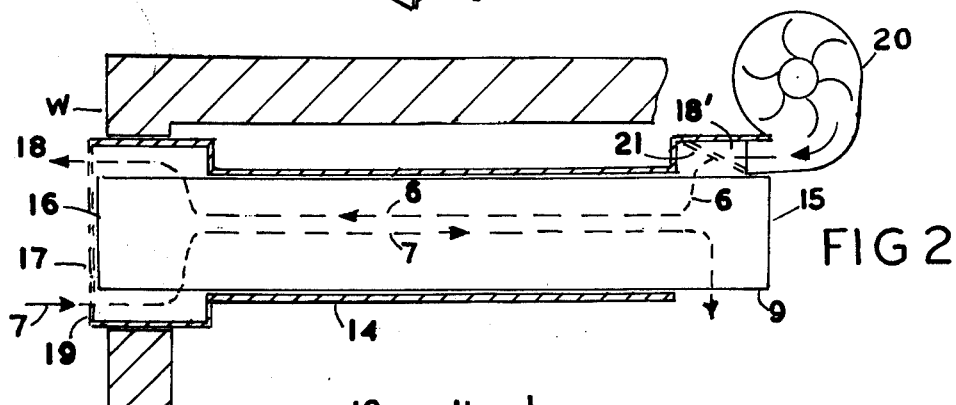
FIG. 2 is a horizontal view, partly in section, showing the heat exchanger of FIG. 1, mounted in a wall by means of a mounting member.
Figure 3:
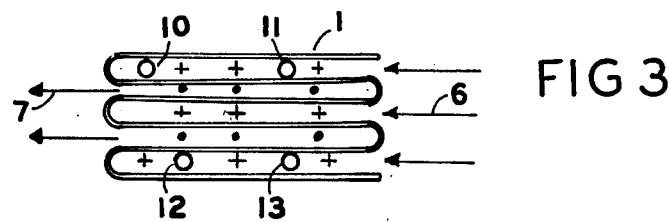
FIG. 3 is a diagram illustrative of the operation of the invention.

FIG. 3 may be thought of as a section through the exchanger taken near the end 15. FIG. 2 shows the air stream 6 entering the folds of the sheet 1 on the right of the figure and passing along one side of the sheet 1, out of the plane of the drawing as shown by the + marks. The air stream 7 passes into the plane of the drawing from the back, as shown by the dots, in contact with the other side of the sheet 1, and passes out of the exchanger on the left side of the figure. The air stream 6 passes out the right of the figure and the air stream 7 passes in at the left at the distant end of the exchanger not shown in FIG. 3. The folds are separated by randomly spaced members 10, 11, 12, 13, etc., which may be grains of sand approximately 1/16 in size. The grains of sand may be stuck on to the paper with an adhesive, such as shellac, and are preferably spaced randomly about ½ inch apart so as not to impede the air flow. The sheet 1, may be water permeable or deliquescent paper, for instance, wet strength kraft paper.

An objective in choosing the spacing of the sheets of the heat and moisture exchanger membrane is to keep the resistance to air flow low, while keeping the volume occupied by the exchanger low and the rate of heat and moisture exchange high. The rate of heat and moisture exchange is proportional to the total area of the membrane, while the resistance to air flow is proportional to path length, inversely proportional to sheet spacing, and inversely proportional to path width. The total volume of the exchanger is proportional to the product of total area of the membrane and spacing of the sheets. Thus it is seen that the total volume of the exchanger can be made small, without sacrificing effectiveness of heat and moisture exchange and without increasing the resistance to air flow, by choice of a smaller length and a smaller spacing of the sheets.

Another consideration is that the air passages should interleave so that rates of flow are approximately equal on the two sides in every part of the heat and moisture exchange membrane. It will be seen in FIG. 1, that the flows will be equal in the central portion of the exchanger, but unequal near the ends, where the flows are concentrated toward the openings. Uniformity of flow is favored by making the sheets narrow in proportion to their length.

Referring to FIG. 2, the folded sheet cartridge 9, may be mounted in a wall W of a structure by means of the mounting member 14. The ends of the folded sheet cartridge 9, are sealed with seals 15, 16 and the outer end of the mounting enclosure 14 preferably has a louvered screen 17. The mounting enclosure has an aperture 18 on the outside end and an aperture 18' on the inside end. A blower or fan 20 is connected to blow the air stream 6 through the cartridge 9 and out of the aperture 18. The return air stream 7 flows through the aperture 19 of the member 14 and then flows between the folds in the opposite direction to the air stream 6 and on the opposite side of the folded sheet as previously described.

A counter flow exchanger depends on having equal mass flows inward and outward. This can be accomplished in various ways. If the room is leak-free, it is only necessary to force air out with a fan, through one set of passages, and the same amount of air will enter through the other set.

Secondly, with two equal fans, it is possible and may be preferred to force air out one set of passages and draw it in through the other, thereby maintaining the pressure inside the room equal to the pressure at the outer end of the exchanger.

If, as a third alternative, one fan forces air out through one set of passages and another fan forces air in through the other set of passages, the two fans should have different speeds or sizes because of the difference of air densities at the two ends of the exchanger.

A partial barrier 21 may be incorporated in the input to distribute the flow among layers and to control the flow rate.

For a medium size room, a small fan of approximately 1/200 H.P. is sufficient to pass approximately 1500 cubic feet of air per hour, which is generally acknowledged to produce satisfactory ventilation for five persons. An exchanger of the size described is 80% efficient in preserving the temperature and humidity of a room at this air flow rate.

I claim:

1. Heat and moisture exchanger means comprising a folded sheet of heat and moisture permeable paper having a plurality of folds,
   means between said folds to separate said folds,
   means closing the end of the folds,
   impermeable means connected to and surrounding the central part of said folded sheet to support said folded sheet and to provide a plurality of air passages on one side of the sheet interleaved in juxtaposition with a plurality of air passages on the other side of the sheet, means connected to the folded sheet to direct air in one direction through said folds on one side of said folded paper, the return air flowing in the opposite direction through said folds on the other side of said folded paper whereby water and heat are transferred through the paper between one air stream and the other air stream flowing in the opposite direction.

2. Apparatus as in claim 1, wherein the folded paper is held by a band encircling the folds.

3. Apparatus as in claim 1, having a frame mounted in a wall, said heat exchanger means being mounted in said frame, and air moving means mounted on said frame to move air through the heat and moisture exchanger.

4. Apparatus as in claim 1, wherein said folds are separated with spaced members adhering to the paper.

5. Apparatus as in claim 4, wherein the spaced members are grains of sand.

* * * * *